(12) United States Patent
Schlüter

(10) Patent No.: US 7,823,984 B2
(45) Date of Patent: Nov. 2, 2010

(54) MASTER BRAKE CYLINDER ARRANGEMENT FOR A HYDRAULIC MOTOR VEHICLE BRAKE SYSTEM AND MOTOR VEHICLE BRAKE SYSTEM

(75) Inventor: Peter Schlüter, Kammerforst (DE)

(73) Assignee: Lucas Automotive GmbH (DE)

( * ) Notice: Subject to any disclaimer, the term of this patent is extended or adjusted under 35 U.S.C. 154(b) by 643 days.

(21) Appl. No.: 11/801,347

(22) Filed: May 9, 2007

(65) Prior Publication Data

US 2007/0284204 A1 Dec. 13, 2007

(30) Foreign Application Priority Data

May 10, 2006 (DE) .................... 10 2006 021 817

(51) Int. Cl.
*B60T 13/20* (2006.01)

(52) U.S. Cl. ..................... 303/114.1; 60/551

(58) Field of Classification Search ......... 188/344–360; 303/114.1–114.3; 60/547.1–582
See application file for complete search history.

(56) References Cited

U.S. PATENT DOCUMENTS

| | | | | |
|---|---|---|---|---|
| 2,541,312 | A | * 2/1951 | Vogel ........................... | 60/589 |
| 3,927,915 | A | * 12/1975 | Adachi ..................... | 303/114.2 |
| 4,604,870 | A | * 8/1986 | Bach et al. ..................... | 60/551 |
| 4,631,924 | A | * 12/1986 | Lowe ........................... | 60/562 |
| 4,794,757 | A | 1/1989 | Schluter | |
| 4,875,338 | A | * 10/1989 | Leiber ........................... | 60/550 |
| 4,964,676 | A | * 10/1990 | Resch ......................... | 303/52 |
| 5,448,888 | A | * 9/1995 | Castel ........................... | 60/580 |

FOREIGN PATENT DOCUMENTS

| | | |
|---|---|---|
| DE | 3715209 A1 | 4/1988 |
| DE | 4028925 A1 | 3/1992 |
| DE | 102005037792 B3 | 5/2007 |

* cited by examiner

*Primary Examiner*—Christopher P Schwartz
(74) *Attorney, Agent, or Firm*—MacMillan, Sobanski & Todd, LLC

(57) ABSTRACT

The invention relates to a master brake cylinder arrangement for a hydraulic motor vehicle brake system having a housing, in which two adjacent cylinder bores are provided, two piston arrangements, in which a first piston arrangement is received in a first cylinder bore of the cylinder bores such that it is displaceable along a first longitudinal bore axis and in which a second piston arrangement is received in a second cylinder bore of the cylinder bores such that it is displaceable along a second longitudinal bore axis, a force input piston which can be coupled, or is coupled, to a brake pedal and which is displaceably guided along an actuating axis in a cutout of the housing, the first piston arrangement and the second piston arrangement being displaceable according to a movement of the force input piston, in which the first piston arrangement delimits a first pressure chamber with the housing, said pressure chamber being fluidically connected to a hydraulic brake system, and in which the second piston arrangement delimits a second pressure chamber with the housing, said pressure chamber being fluidically connected to the hydraulic brake system. It is provided that, arranged between the first piston arrangement and the second piston arrangement and the force input piston, there is a transmission element on which a coupling projection is mounted, which is connected, or can be connected, in force-transmitting manner to the force input piston for common movement.

19 Claims, 4 Drawing Sheets

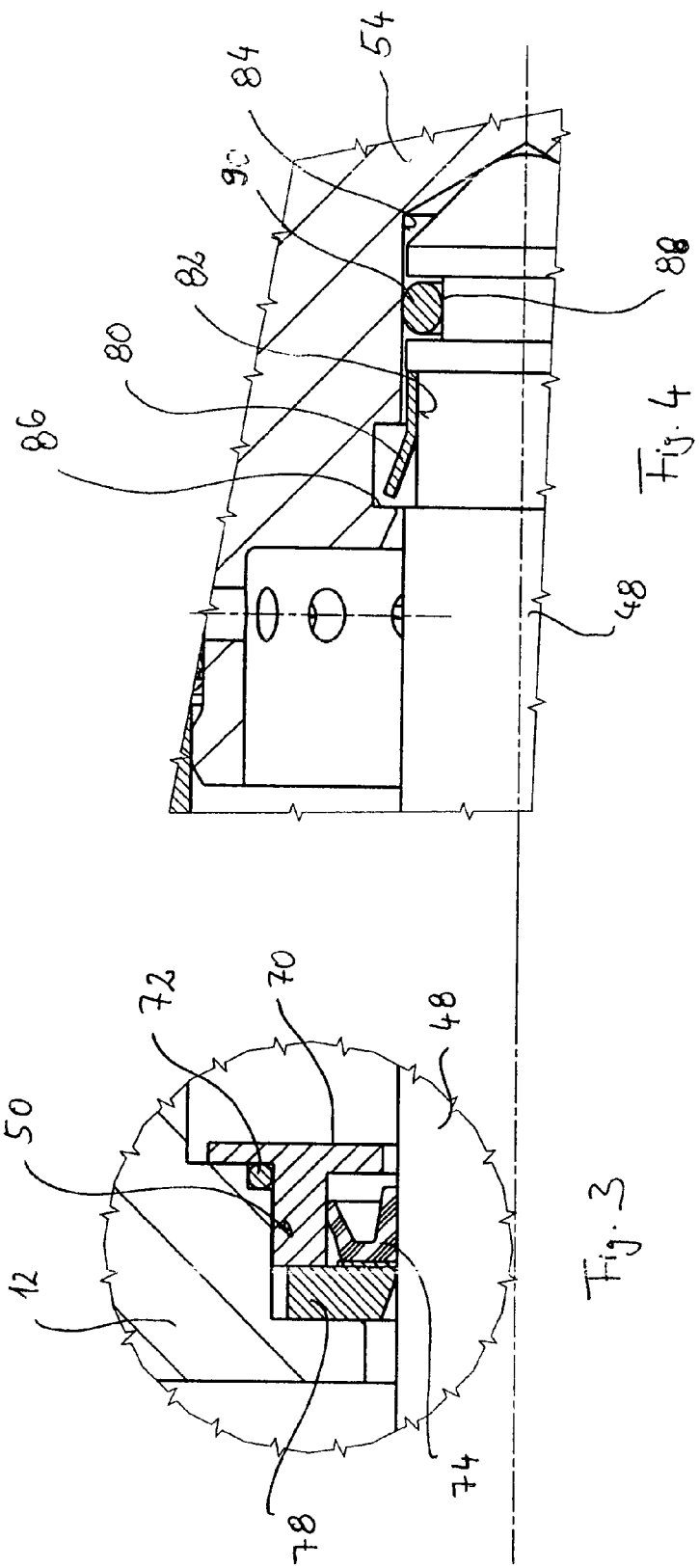

MASTER BRAKE CYLINDER ARRANGEMENT FOR A HYDRAULIC MOTOR VEHICLE BRAKE SYSTEM AND MOTOR VEHICLE BRAKE SYSTEM

CROSS REFERENCE TO RELATED APPLICATION

This application claims priority to German Patent Application No. 10 2006 021 817.5 filed May 10, 2006, the disclosure of which is incorporated herein by reference.

BACKGROUND OF THE INVENTION

The present invention relates to a master brake cylinder arrangement for a hydraulic motor vehicle brake system having a housing, in which two adjacent cylinder bores are provided, two piston arrangements, in which a first piston arrangement is received in a first cylinder bore of the cylinder bores such that it is displaceable along a first longitudinal bore axis and in which a second piston arrangement is received in a second cylinder bore of the cylinder bores such that it is displaceable along a second longitudinal bore axis, a force input piston which can be coupled, or is coupled, to a brake pedal and which is displaceably guided along an actuating axis in a cutout of the housing, the first piston arrangement and the second piston arrangement being displaceable according to a movement of the force input piston, in which the first piston arrangement delimits a first pressure chamber with the housing, said pressure chamber being fluidically connected to a hydraulic brake system, and in which the second piston arrangement delimits a second pressure chamber with the housing, said pressure chamber being fluidically connected to the hydraulic brake system.

A master brake cylinder arrangement of this type is known for example from document DE 37 15 209 A1, and corresponding U.S. Pat. No. 4,794,757, both of which are incorporated by reference herein. The construction of this is similar to that of a tandem master brake cylinder arrangement, although it takes up much less space since the two piston arrangements operate in the mutually adjacent cylinder bores which are coupled hydraulically together. Upon braking, a pedal actuating force, by way of which the brake pressure is then generated in the hydraulic brake arrangement, is introduced into the first piston. In other words, in a brake system which is equipped with this master brake cylinder arrangement, the necessary hydraulic brake pressure for acting on the wheel brake of the vehicle is generated solely by the master brake cylinder arrangement.

A directly coupled brake system of this type is disadvantageous in that the driver influences the hydraulic pressure on the wheel brakes in each case by his actuating action on the brake pedal. This is not a problem as long as this is conducive to the braking situation. However, if the driver reacts incorrectly to the actual braking situation, for example by applying too much or too little brake pressure, the braking behaviour, and in particular the braking distance and the path of the vehicle, can become adversely affected, leading in the worst case to an accident.

A further disadvantage of this arrangement is that the two piston arrangements in the corresponding cylinder bores are coupled hydraulically together. The problem with this is that, in the event of a malfunction, particularly a leak in the region of the piston arrangement which is moved directly by actuating the brake pedal, it is no longer possible to reliably control the piston arrangement connected downstream.

The applicant's subsequently published patent application with file reference DE 10 2005 037 792 discloses a master brake cylinder arrangement in which the transmission element is not optimally constructed to absorb eccentrically acting counter forces and resultant tilting moments, which can lead to a malfunction. Eccentrically acting counter forces of this type are caused for example by one of the piston arrangements no longer functioning properly owing to a leak, so that, in the corresponding operating situation, only one of the piston arrangements is still able to act on the transmission element. This means that the transmission element is only in contact with the wall of the housing at certain points, which can lead to a locally delimited high load and a correspondingly high degree of wear.

BRIEF SUMMARY OF THE INVENTION

The object of the present invention is to provide a master brake cylinder arrangement and a correspondingly constructed motor vehicle brake system of the type mentioned at the outset which, with a simple and economical construction, ensure reliable operation even in the event of high eccentrically acting forces.

This object is achieved by a master brake cylinder arrangement of the type mentioned at the outset, in which, arranged between the first piston arrangement and the second piston arrangement and the force input piston, there is a transmission element which may be moved into contact with the first and second piston arrangement and on which a coupling projection is mounted, which is guided in the housing and is connected, or can be connected, in force-transmitting manner to the force input piston for common movement.

According to the invention, the two piston arrangements can therefore be coupled to the force input piston—namely by means of the transmission element. Therefore, in the event of a leak in one of the hydraulic systems associated with the piston arrangements, at least the other hydraulic system in each case can be controlled directly by way of the force input piston. Hydraulic actuation of one piston arrangement by way of the hydraulic system associated with the other piston arrangement in each case does not apply here.

The coupling projection is provided to improve the guidance of the transmission element in the housing, particularly in the event of possible transverse force loads which may be applied to the transmission element during manual actuation. Transverse force loads of this type can occur for example as result of different reaction forces of the first and second piston arrangement or particularly if one of the two piston arrangements fails completely and therefore only the piston arrangement which is still functional exerts notable forces eccentrically on the transmission element. As a result of the coupling projection provided according to the invention, transverse forces of this type, starting from the transmission element, are also transmitted via the projection to the force input element guided in the housing. The transverse forces are therefore distributed both to the bearing of the transmission element and the bearing of the force input element and are transferred by way of these into the housing. The fact that the active bearing points are at a considerable axial spacing due to the use of the coupling projection enables the forces acting on the transmission element to be considerably reduced, resulting in substantially less wear on the transmission element and therefore improved and more reliable operation.

It can be provided here for the transmission element to be displaceable in a transmission chamber associated therewith. The transmission element therefore has room for movement play, is reliably received in the master brake cylinder arrangement and can be guided more easily in the transmission chamber.

It is furthermore possible for a transmission element restoring spring to be arranged in the transmission chamber, which spring can preferably bias the transmission element in the direction of the force input piston. The transmission element restoring spring can furthermore be designed according to the invention such that it biases the transmission element away from the piston arrangements. This enables an actuating force acting on the force input element to be absorbed in controlled manner.

The transmission element can be constructed in a cup-shape at its end facing the piston arrangements and thus receive a portion of the transmission element restoring spring in the cup,—the said portion being that which faces the transmission element—so that the spring can be reliably mounted without jamming or slipping.

In a preferred embodiment of the invention, a play or spacing is provided between the transmission element and the ends—facing the transmission element—of the first and the second piston arrangement in the rest condition of the master brake cylinder arrangement.

It is preferable here for the play to be measured such that a pedal is actuated for braking in normal mode without a mechanical coupling being effected between the force input piston and the first and second piston arrangement. It is thus possible to prevent the brake from being adversely affected in normal mode by applying the actuating force to the piston arrangements.

On the other hand, it is desirable within the scope of the invention for the play between the transmission element and the piston arrangements to be measured such that actuation of the pedal for braking in emergency mode results in the transmission element overcoming the play and enables a mechanical coupling to be effected between the force input piston and the first and second piston arrangement.

As a result of measuring the play between the transmission element and the piston arrangements in this way, it is ensured in normal mode that the force input element and the piston arrangement are completely mechanically decoupled and braking is carried out by way of a controlled auxiliary brake force system without an actuating force which is exerted on the brake pedal influencing the braking procedure in uncontrolled and unexpected manner. On the other hand, if, in emergency mode, a servo brake force system were to fail, for example, a direct mechanical coupling of the brake pedal with the brake circuit is reliably ensured in a manner which is realised simply and economically.

With regard to the coupling projection, a variant embodiment of the invention provides for this to be integrally formed in one piece on the transmission element. It is also alternatively possible for the coupling projection to be coupled to the transmission element in a different way. Thus, it can also be constructed for example separately from the transmission element and fixedly connected thereto. The coupling projection can furthermore be of a cylindrical construction. This enables the transmission element and coupling projection to be constructed relatively simply.

The coupling projection preferably extends along the actuating axis of the force input piston, thus resulting in a smooth flow of forces which minimises jamming or canting of movable components.

In a preferred embodiment of the invention, it is provided for the force input piston to delimit a pedal counter force pressure chamber together with the housing, said pedal counter force pressure chamber preferably being connected to a pedal counter force simulation device. In normal mode, this enables the braking sensation experienced by the user to be adapted to the force which he exerts on the brake pedal.

According to the invention, it can be provided for the coupling projection to be guided in a sealing arrangement mounted in the housing. The sealing arrangement preferably has a sealing bush which receives at least one sealing element which acts in sealing manner on the coupling projection and is held axially in position by a cover disc. According to the invention, the cover disc can thus have a defined radial spacing from the surrounding housing and/or be borne in floating manner. The floating mounting of the cover disc enables it to adapt flexibly to the axial position of the projection with respect to the housing. In particular, it is thus possible to avoid costly restrictions to the manufacturing tolerances or adjusting processes. The sealing arrangement preferably delimits a front end of the pedal pressure force chamber.

To provide a reliable connection between the force input piston and the coupling projection, it can be provided for the coupling projection to be received in a central cutout in the force input piston.

According to a further development of the invention, the coupling projection can be provided with a resilient coupling element which, after the coupling projection has been inserted in the associated cutout of the force input piston, latches in such a way that a force-transmitting coupling is effected between the coupling projection and the force input piston. This enables simple assembly of the components whilst ensuring a reliable load-bearing connection.

The master brake cylinder arrangement can be designed such that the adjacent cylinder bores extend substantially parallel to one another. It can furthermore be provided for the first and second piston arrangement to each be biased in a starting position towards the transmission element by piston restoring springs. All in all, this enables a linear force path in emergency mode. Possible jamming of components is prevented or hindered. Furthermore, accidental triggering of a brake action resulting from an unwanted movement of one of the piston arrangements from the starting position is prevented.

In an inventive variant embodiment of the invention, it is provided for an additional slide cylinder to be arranged between the transmission element and the housing, which slide cylinder is located in the contact region between the transmission element and the surrounding housing wall. This slide cylinder is preferably coupled with force fit to the transmission piston.

It is furthermore desirable for the slide cylinder to be made from a frictionally optimised material to minimise frictional wear. It is particularly advantageous if the slide cylinder extends over a relatively large area. It can preferably have a length here which corresponds approximately to the length of the transmission element. This enables the transverse forces introduced to be distributed over a relatively large area, thus reducing the surface load in the region of the transmission element.

The invention furthermore relates to a motor vehicle brake arrangement having a master brake cylinder system of the type described above.

Other advantages of this invention will become apparent to those skilled in the art from the following detailed description of the preferred embodiment, when read in light of the accompanying drawings.

BRIEF DESCRIPTION OF THE DRAWINGS

FIG. 3 an enlarged illustration of the region denoted by III in FIG. 1;

FIG. 4 an enlarged illustration of the region denoted by IV in FIG. 1;

DETAILED DESCRIPTION OF THE INVENTION

Figure 1:
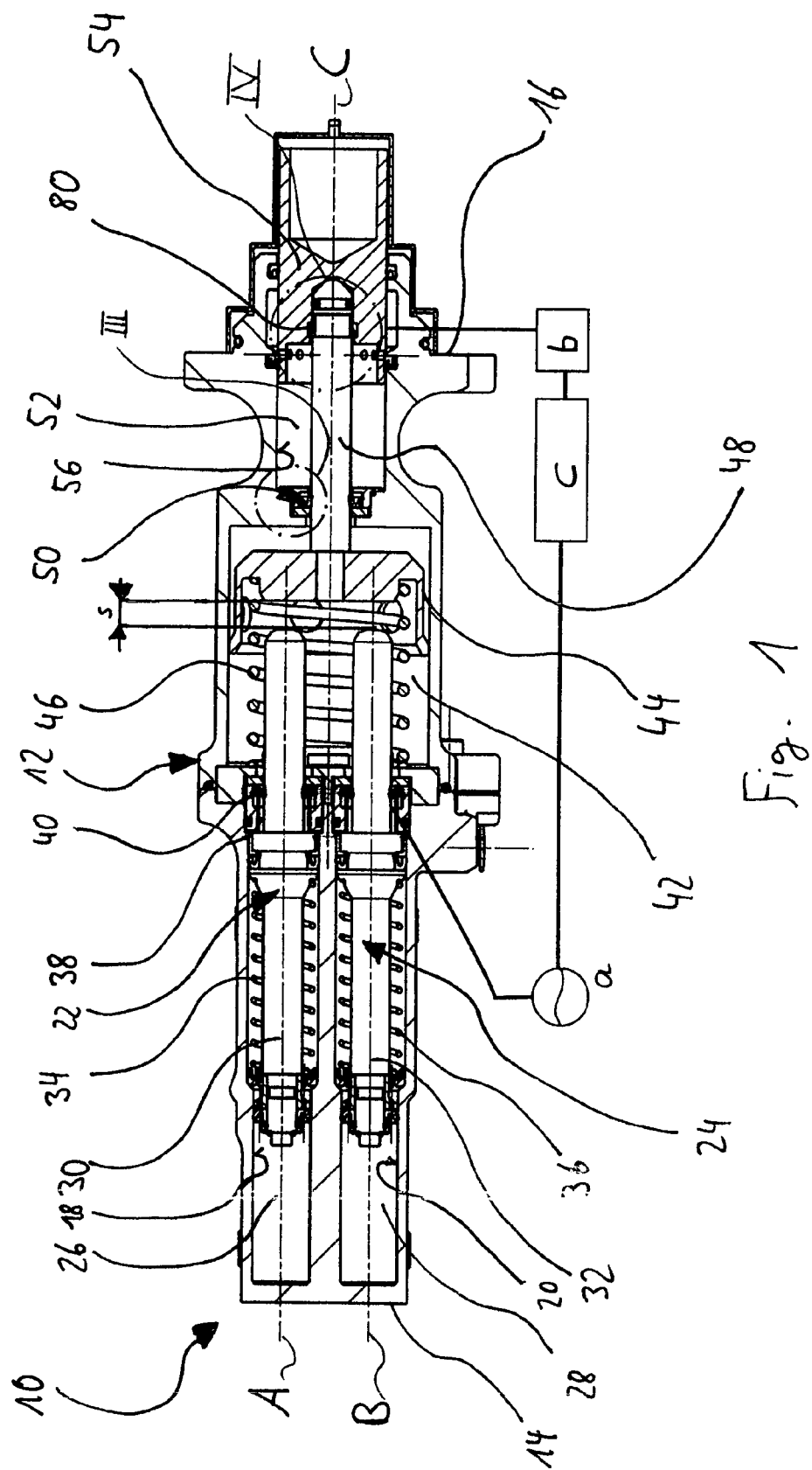
FIG. 1 a first embodiment of the invention in longitudinal section.

FIG. 1 shows a first possible embodiment of the master brake cylinder arrangement 10 according to the invention in longitudinal section. A housing 12 is provided for the master brake cylinder arrangement 10, which, in this embodiment, is composed of the lower housing part 14 and the upper housing part 16. The housing parts 14 and 16 are coupled together by means of a screw connection. In the housing 12, a first cylinder bore 18 is provided along a first longitudinal bore axis A and a second cylinder bore 20 is provided along a second longitudinal bore axis B.

A first piston arrangement 22 is received such that it is displaceable along the longitudinal bore axis A and a second piston arrangement 24 is arranged such that it is displaceable along the bore axis B. The first piston arrangement 22 delimits a first pressure chamber 26 with the housing 12 and the second piston arrangement 24 delimits a second pressure chamber 28 with the housing 12. The pressure chambers 26 and 28 are connected to brake circuits, leading to the wheel brakes, which is not shown in the Figures. The piston arrangements 22 and 24 each have input pistons 30 and 32 which are biased in a starting position by piston restoring springs 34 and 36. A servo chamber 38 is connected to a servo pressure source a. The piston arrangements 22 and 24 are sealed by piston seal arrangements 40.

The end portions—facing right in FIG. 1—of the input pistons 30, 32 project into a transmission chamber 42 which is received in the housing 12. A transmission element 44 is arranged and guided in this transmission chamber. The transmission element 44 is arranged with a defined spacing or play s from the end portions of the input pistons 30, 32.

A transmission element restoring spring 46 is arranged in the transmission chamber 42. A coupling projection 48, which is of a cylindrical construction in this embodiment, is rigidly coupled to the transmission element 44, for example by screwing. This coupling projection 48 extends through a seal arrangement 50 and through a pedal pressure force chamber 52 and is received in a force input element 54.

The force input piston 54 is coupled to a brake pedal (not illustrated in the Figure). It is displaceably guided along an actuating axis C in a cutout 56 in the housing.

The transmission element restoring spring 46 biases the transmission element 44 to the right in FIG. 1. At the same time, the transmission element restoring spring 46 biases the transmission element 44 away from the piston arrangements 22 and 24. The transmission element 44 is constructed in a cup-shape at its end facing the piston arrangements 22 and 24 and has, in the base of the cup, an annular depression in which one end of the transmission element restoring spring 46 is received.

The sealing arrangement 50 receives the coupling projection 48 in displaceable and sealing manner. It forms the front delimitation of the pedal pressure force chamber 52 together with the housing 12. The pedal pressure force chamber 52 is connected to a pedal counter force simulation device (not illustrated).

FIG. 3 shows an enlarged illustration of the sealing arrangement 50. FIG. 3 shows, in particular, that the sealing arrangement 50 is constructed with a sealing bush 70, a first sealing element 72 and a second sealing element 74. The first sealing element 72 seals the sealing bush 70 with respect to the housing 12. The sealing element 74 abuts against the side of the coupling projection 48, held axially in position by a cover disc 78. The cover disc 78 here has a defined radial spacing from the surrounding housing 12 and can therefore be mounted in floating manner. It therefore adapts to the radial position of the coupling projection 48.

At its left end in FIG. 1, the coupling projection 48 is provided with a resilient coupling element 80 (as shown in detail in FIG. 4). The resilient coupling element 80 is received in a groove 82 in the coupling projection 48. It has arms which project radially outwards at a sloping angle and which are resiliently flexible. After the coupling projection 48 has been introduced into an associated cutout 84 in the force input element 54, the resilient arms of the coupling element 80 latch behind a cylindrical undercut 86 arranged therein, thus resulting in a coupling between the coupling projection 48 and the force input element 54. It can furthermore be seen that a further groove 88 is provided in the coupling projection 48, in which a sealing region 90 is received so that the coupling projection 48 is received in fluid-tight manner in the force input element 54.

A schematically indicated sensor arrangement b is furthermore provided to determine when the force input element 54 has been displaced as a result of a brake pedal actuation and to pass this on to a monitoring and control device c for evaluation. This monitoring device c determines the intention of the driver with regard to the desired slowing-down of the vehicle and effects a corresponding increase in pressure in the servo chamber 38 by way of the servo pressure source a, which then triggers an actuating movement of the input pistons 30, 32. When the brake is actuated in this way in normal mode, the play s between the transmission element 44 and the input pistons 30 and 32 is not overcome, which means that there is no mechanical coupling between these components. The displacement of the input pistons 30, 32 is only effected under servo control and is completely mechanically decoupled from the force input element 54.

In an emergency situation, for example if the brake control system with the components a, b and c indicates a malfunction, the master brake cylinder arrangement falls back to a clearance plane. At the start of such emergency braking, the force input element 54 is displaced to the left in the figure and the actuating force introduced by way of the pedal actuation is transferred to the transmission element 44 by way of the coupled coupling projection 48. This transmission element is displaced synchronously with the force input piston 54 in opposition to the transmission restoring spring 46 until there is no longer any play s. It then abuts against the end faces of the input pistons 30 and 32 and produces a force fit with these. A further actuating movement of the force input element 54 is then converted directly into a stroke movement of the input pistons 30 and 32, thus activating the wheel brakes in known manner.

If the reaction forces from the piston arrangements 22 and 24 on the transmission element are different here, perhaps because one of the two brake circuits connected to the pressure chambers 26 and 28 has failed, the transmission element 44 is subjected to a tilting moment which impairs its linear guidance. However, this tilting moment is partially transmitted by the coupling projection 48 to the remotely arranged force input element 54 which can be radially supported with regard to its guidance. The transverse forces resulting from the tilting moment are thus distributed to the bearings of the transmission element 44 and the force input element 54, thus significantly reducing the load on the transmission element 44. In particular, the lever action resulting from the large spacing between the bearing points significantly reduces the transverse force load acting on the transmission element 44.

Figure 2:
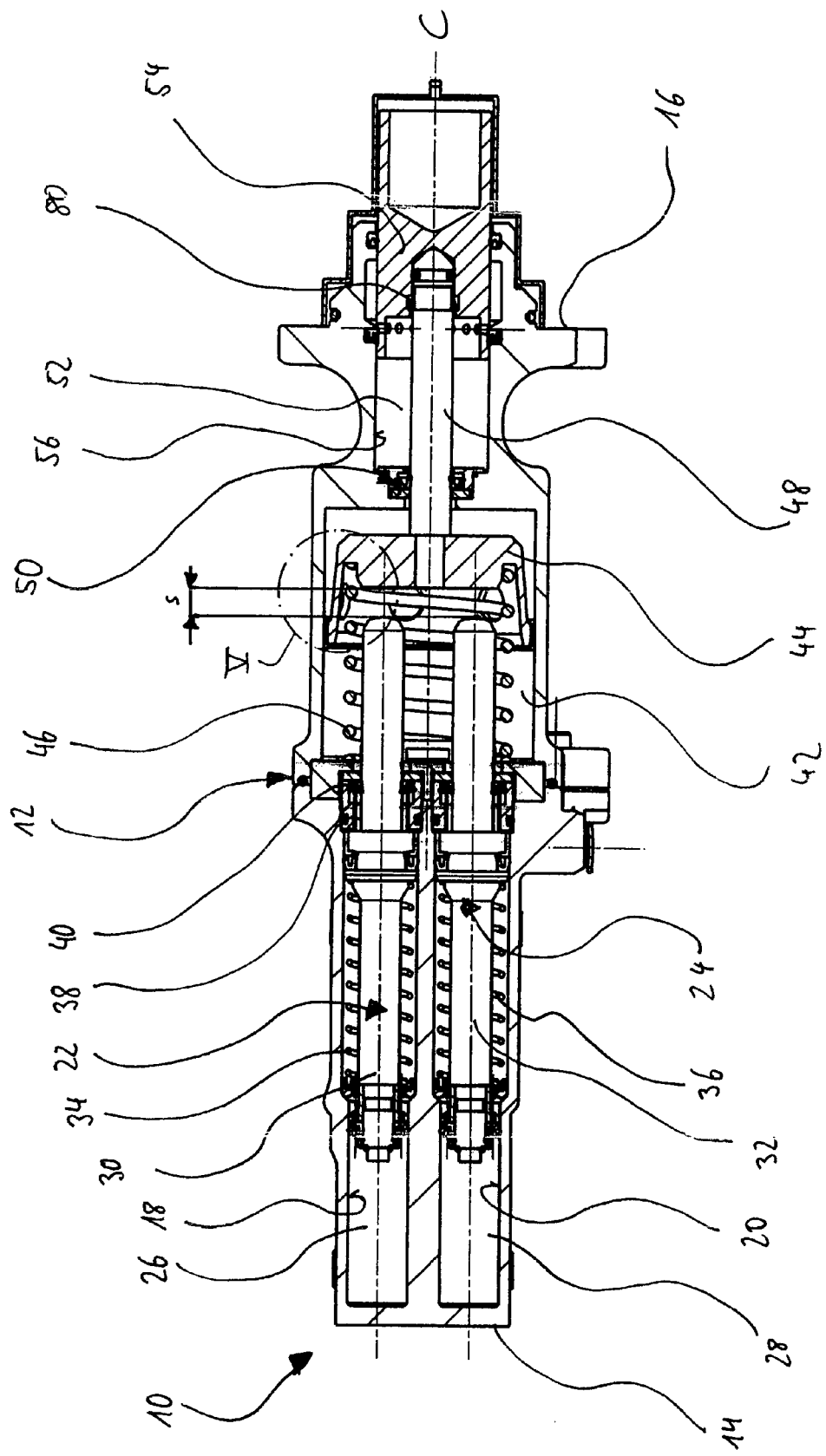
FIG. 2 a second embodiment of the invention in longitudinal section.

FIG. 2 shows a second embodiment of the present invention. Owing to the great similarity with the embodiment described in FIG. 1, the previous reference numerals are maintained, although the elements a, b, c are not shown in this figure.

Figure 5:
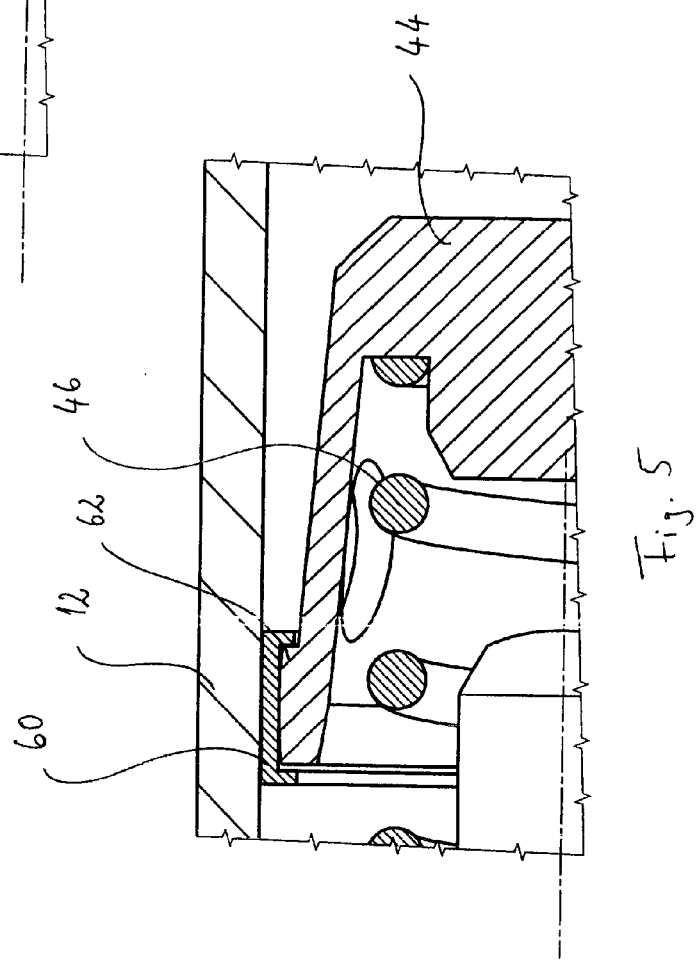
FIG. 5 an enlarged illustration of the region denoted by V in FIG. 2.

The basic difference between the embodiment shown in FIG. 2 and the embodiment according to FIG. 1 is that a slide cylinder 60 is additionally provided between the transmission element 44 and the wall of the housing 12. As the enlarged illustration according to FIG. 5 also shows, this is force-fittingly connected to the transmission element 44 and ensures less friction against the housing wall. On the one hand, this reduces the frictional wear and, on the other, the transmission element 44 is provided with a larger bearing surface so that the transverse forces produced act with a smaller surface load.

It is furthermore shown that the slide cylinder 60 is form-fittingly mounted and fixed on a circumferential projection 62 which is constructed in one piece with the transmission element 44.

Figure 6:
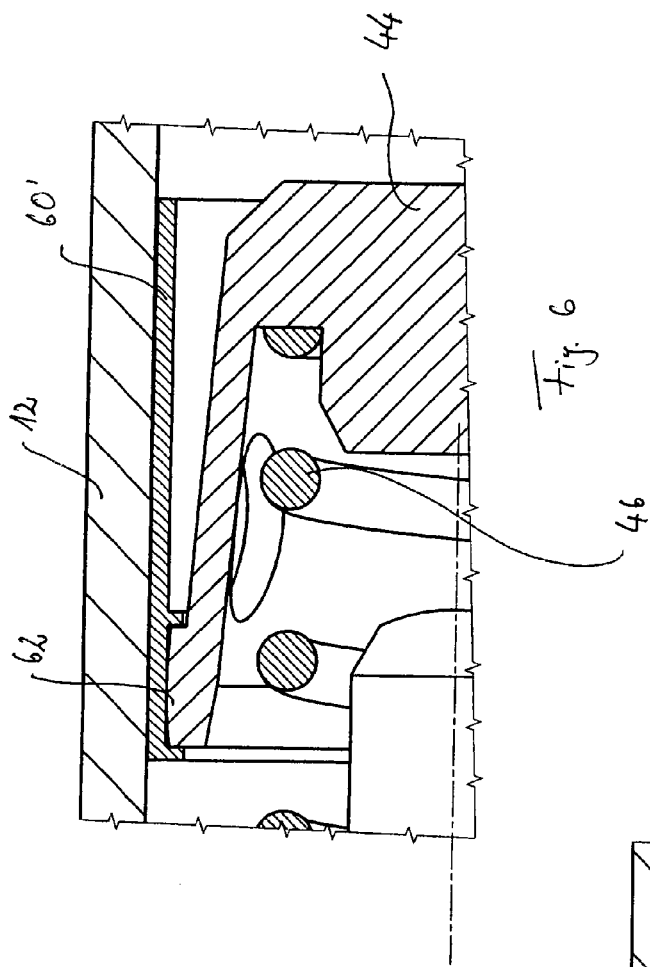
FIG. 6 an embodiment of the invention which has been modified slightly by comparison with FIG. 5.

FIG. 6 shows a slightly modified embodiment in which the slide cylinder 60' is of a considerably longer construction. FIG. 6 shows that the slide cylinder 60' has approximately the same axial length as the transmission element 44. This further improves its guidance.

In summary for all embodiments, it should be stated that, particularly as a result of the distribution of the tilting moments acting on both the radial bearing points of the transmission element 44 and the radial bearing points of the force input piston 54 when an eccentric force is exerted on the transmission element 44, undesirable canting or even jamming of the transmission element 44 and moreover the appearance of undesirable wear on its outer circumference can be effectively prevented. This effect can be advantageously reinforced by the further developments described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A master brake cylinder arrangement for a hydraulic motor vehicle brake system having
    a housing defining first and second bores adjacent to one another, said housing further defining third and fourth bores;
    a first piston received in said first bore such that it is displaceable along a first longitudinal bore axis, wherein said first piston delimits a first pressure chamber with said housing, said first pressure chamber adapted to be fluidically connected to a hydraulic brake system,
    a second piston received in said second bore such that it is displaceable along a second longitudinal bore axis, wherein said second piston delimits a second pressure chamber with said housing, said second pressure chamber adapted to be fluidically connected to the hydraulic brake system;
    a force input piston adapted to be coupled to a brake pedal and which is received in said third bore of said housing and is displaceably guided along an actuating axis, wherein said force input piston delimits a third pressure chamber with said housing, wherein said master brake cylinder arrangement is adapted to be actuated such that movement of said input piston causes an increase of pressure within said third pressure chamber; and
    a transmission element slidably disposed in said housing and arranged between said first and second pistons and said force input piston for transmitting forces from said force input piston to said first and second pistons, wherein said transmission element is provided with a bearing surface adjacent a wall of said fourth bore for distributing transverse forces acting on said transmission element by said first and second pistons to said housing.

2. The arrangement of claim 1, wherein said transmission element is sealingly engaged with said wall of said fourth bore.

3. The arrangement of claim 2, wherein a fluid servo chamber is defined between said first and second pistons and said transmission element.

4. The arrangement of claim 3, wherein said fluid servo chamber is connected to a servo pressure source.

5. The arrangement of claim 1, wherein a transmission element restoring spring is arranged in said fourth bore.

6. The arrangement of claim 5, wherein said transmission element restoring spring biases said transmission element in the direction of said force input piston.

7. The arrangement of claim 5, wherein said transmission element restoring spring biases the transmission element away from said first and second pistons.

8. The arrangement of claim 1, wherein said transmission element interacts with a coupling projection which is connected in force-transmitting manner to said force input piston for common movement.

9. The arrangement of claim 8, wherein said coupling projection is guided in a sealing arrangement mounted in said housing.

10. The arrangement of claim 8, wherein said coupling projection extends along the actuating axis of said force input piston.

11. The arrangement of claim 1, wherein said third chamber is connected to a pedal counter force simulation device.

12. The arrangement of claim 11, wherein said third fluid chamber is connected to said pedal counter force simulation device such that fluid is permitted to flow between said third chamber and said pedal counter force simulation device.

13. The arrangement of claim 1, wherein said first and second pressure chambers are connected to wheel brakes.

14. The arrangement of claim 1, wherein said transmission element is constructed in a cup-shape.

15. The arrangement of claim 1, wherein a slide cylinder is arranged between said transmission element and said housing.

16. A motor vehicle brake system having a master brake cylinder arrangement according to claim 1.

17. A master brake cylinder arrangement for a hydraulic motor vehicle brake system having
    a housing, in which two adjacent cylinder bores are provided, two piston arrangements, in which a first piston arrangement is received in a first cylinder bore of the cylinder bores such that it is displaceable along a first longitudinal bore axis and in which a second piston arrangement is received in a second cylinder bore of the cylinder bores such that it is displaceable along a second longitudinal bore axis, a force input piston which can be coupled, or is coupled, to a brake pedal and which is displaceably guided along an actuating axis in a cutout of the housing, the first piston arrangement and the second piston arrangement being displaceable according to a movement of the force input piston, in which the first piston arrangement delimits a first pressure chamber with the housing, said first pressure chamber being fluidically connected to a hydraulic brake system, and in which the second piston arrangement delimits a second pressure chamber with the housing, said second pressure chamber being fluidically connected to the hydraulic brake system, and wherein, arranged between the first piston arrangement and the second piston arrangement and the force input piston, there is a transmission element which interacts with a coupling projection which is connected in force-transmitting manner to the force input piston for common movement, wherein the coupling projection is guided in a sealing arrangement mounted in the housing, and wherein the sealing arrangement has a sealing bush which receives at least one sealing element which acts in sealing manner on the coupling projection and is held axially in position by a cover disc.

18. A master brake cylinder arrangement according to claim 17, wherein the cover disc is borne in floating manner in the housing.

19. A motor vehicle brake system having a master brake cylinder arrangement according to claim 17.

* * * * *